United States Patent
Xing

(10) Patent No.: US 7,369,180 B2
(45) Date of Patent: May 6, 2008

(54) METHOD FOR PROCESSING AUXILIARY INFORMATION IN A VIDEO SYSTEM

(75) Inventor: Mike Xing, Fishers, IN (US)

(73) Assignee: Thomson Licensing, Boulogne-Billancourt (FR)

(*) Notice: Subject to any disclaimer, the term of this patent is extended or adjusted under 35 U.S.C. 154(b) by 1145 days.

(21) Appl. No.: 10/347,954

(22) Filed: Jan. 21, 2003

(65) Prior Publication Data

US 2003/0145337 A1    Jul. 31, 2003

Related U.S. Application Data

(60) Provisional application No. 60/354,053, filed on Jan. 31, 2002.

(51) Int. Cl.
*H04N 5/50* (2006.01)
(52) U.S. Cl. .............. 348/569; 348/468; 348/589; 345/471
(58) Field of Classification Search ........... 348/468, 348/563, 589, 569; 345/26, 470–472.2
See application file for complete search history.

(56) References Cited

U.S. PATENT DOCUMENTS 4,193,071 A * 3/1980 Hasegawa et al. ............ 345/26
4,388,621 A * 6/1983 Komatsu et al. ............. 345/213

FOREIGN PATENT DOCUMENTS

| EP | 0372384 A | 6/1990 |
| WO | WO0195617 A | 12/2001 |

OTHER PUBLICATIONS

European Search Report of Aug. 22, 2003.

* cited by examiner

*Primary Examiner*—M. Lee
(74) *Attorney, Agent, or Firm*—Joseph J. Laks; Robert D. Shedd; Brian J. Cromarty

(57) ABSTRACT

A method for processing auxiliary information, such as closed caption or teletext data, in a video system enables an increased number of characters to be displayed per line. According to an exemplary embodiment, a video system (100) includes a tuner (10) operative to receive a video signal including auxiliary information representative of a first number of characters to be displayed per line. A memory (13) is operative to store display list data representative of the received auxiliary information. A controller (11) is operative to retrieve the stored display list data in accordance with a format representative of a second number of characters per line, the second number being less than the first number.

15 Claims, 4 Drawing Sheets

METHOD FOR PROCESSING AUXILIARY INFORMATION IN A VIDEO SYSTEM

This application claims priority to and all benefits accruing from a provisional application filed in the United States Patent and Trademark Office on Jan. 31, 2002, and there assigned serial No. 60/354,053.

BACKGROUND OF THE INVENTION

1. Field of the Invention

The present invention generally relates to video systems, and more particularly, to a technique for processing auxiliary information, such as closed caption or teletext data, in a video system that enables, among other things, an increased number of characters to be displayed per line.

2. Background Information

Video systems such as television signal receivers enable images to be displayed based on information contained in signals received by the system. In particular, such systems enable display of a main image, and may also enable display of auxiliary information such as closed caption or teletext data. Data required to produce an auxiliary information display may be included as an auxiliary information component of a video signal. Such data may define both the content and format of the auxiliary information to be displayed.

Certain types of auxiliary information may be used to produce images that represent information occurring in real-time with respect to a video program. For example, closed caption or teletext data may be extracted from a video signal and decoded to produce text in the form of a caption associated with the video program. In particular, the caption may provide a visual representation of the real-time audio component of the video program.

Existing video systems that enable display of such auxiliary information typically have limitations regarding the number of characters that can be displayed on a given line. For example, such video systems typically store received auxiliary information in a memory, and retrieve the information from memory for display on an on-going basis. Moreover, such video systems often have a hardware and/or other limitation that causes the auxiliary information to be retrieved from memory on a line-by-line basis with the assumption that each line has a given number of characters. As a result of this limitation, only a given number of characters can be displayed per line, which in some instances, causes characters to be undesirably cut off at the end of a line.

Accordingly, there is a need for a technique for processing auxiliary information, such as closed caption or teletext data, in a video system that avoids the foregoing problems, and thereby enables an increased number of characters to be displayed per line. The present invention addresses these and other issues.

SUMMARY OF THE INVENTION

In accordance with an aspect of the present invention, a method for enabling display of auxiliary information included in a video signal is disclosed. According to an exemplary embodiment, the method comprises steps of receiving the auxiliary information representative of a first number of characters to be displayed per line, storing display list data representative of the received auxiliary information, retrieving the stored display list data using a controller, wherein the controller is adapted to retrieve the stored display list data in accordance with a format representative of a second number of characters per line, the second number being less than the first number, and outputting pixel data to enable the display of the auxiliary information, wherein the display provides the first number of characters per line.

In accordance with another aspect of the present invention, a video system for enabling display of auxiliary information included in a video signal is disclosed. According to an exemplary embodiment, the video system comprises means for receiving the auxiliary information representative of a first number of characters to be displayed per line, means for storing display list data representative of the received auxiliary information, and means for retrieving the stored display list data in accordance with a format representative of a second number of characters per line, the second number being less than the first number.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

In the following description, exemplary embodiments of the present invention are described with an emphasis on closed caption data. However, it will be intuitive to those skilled in the art that the principles of the present invention are also applicable to other types of auxiliary information, such as teletext data.

Figure 1:
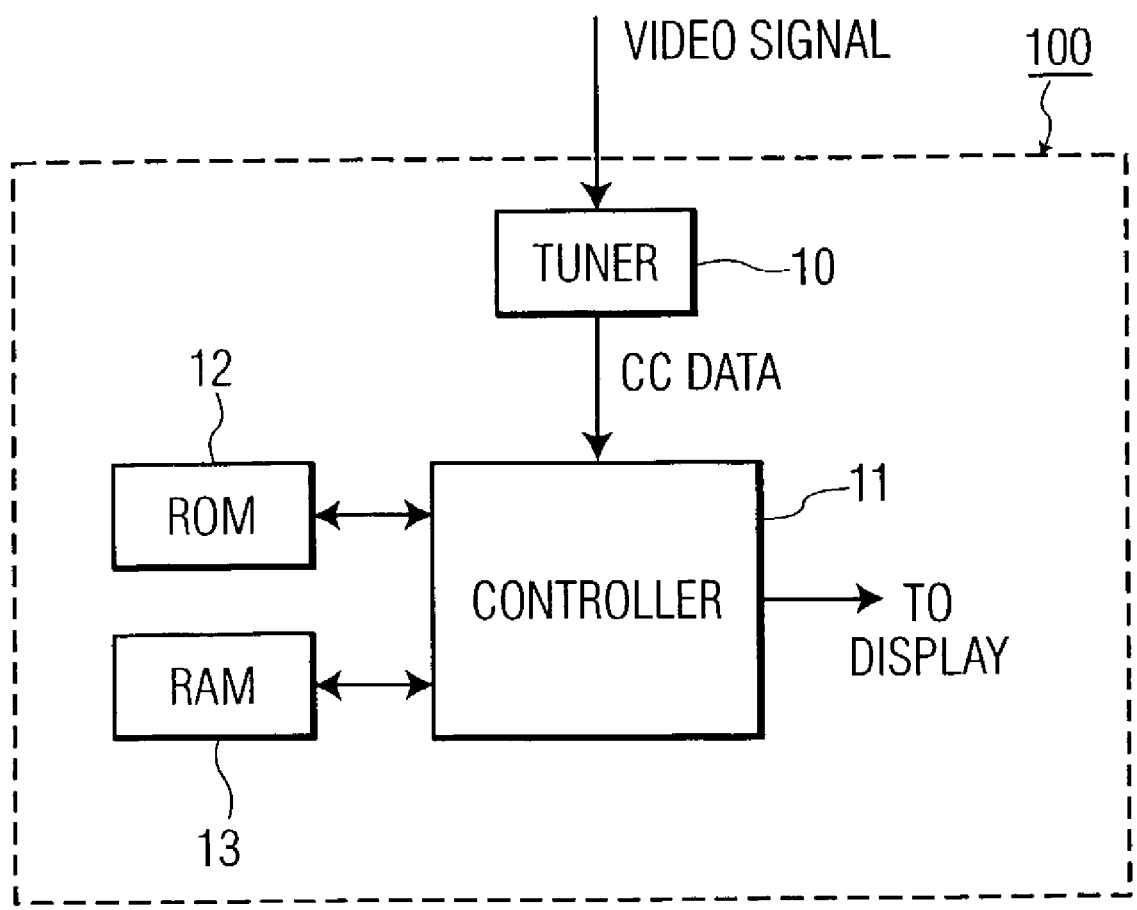
FIG. 1 is a diagram of a relevant portion of a video system suitable for implementing the present invention.

Referring now to the drawings, and more particularly to FIG. 1, a diagram of a relevant portion of a video system 100 suitable for implementing the present invention is shown. Video system 100 comprises a tuner 10, a controller 11, a read-only memory ("ROM") 12, and a random access memory ("RAM") 13. The aforementioned components may, for example, be embodied in one or more integrated circuits ("ICs").

According to an exemplary mode of operation, tuner 10 receives an incoming video signal and extracts therefrom closed caption data. The closed caption data may be extracted from a particular portion of the incoming video signal, such as from the vertical blanking interval ("VBI") of an analog video signal, or from one or more packets of a digital video signal. Controller 11 receives the closed caption data from tuner 10, and processes the same to enable generation of a closed caption display in accordance with principles of the present invention. ROM 12 stores data comprising a program that is executed by controller 10 to parse the closed caption data and enable generation of a closed caption display according to principles of the present invention. RAM 13 stores data comprising bitmap and font data, and display list data generated by controller 10 during the process of generating a closed caption display according to principles of the present invention.

As will be explained later herein, the present invention uses a display list architecture comprising a linked list of display lines (i.e., bands) which allows a display region, such as a television screen, to be divided into rectangular regions referred to as tiles. Such tiles are also represented in memory. In general, the number of tiles represented in memory does not necessarily correspond to the number of characters that can be displayed. For efficiency reasons, however, existing systems typically use a single tile in memory for each display character. Each tile may have the following attributes: a bitmap pointer, a palette index, a resolution, a height, and a width. The bitmap pointer points to an address in RAM 13 containing a character bitmap to be displayed in the tile. The palette index specifies the color and/or transparency attributes of a particular tile. The resolution specifies the number of bits per pixel of the character bitmap to be displayed. The height specifies the height of a tile in pixels. The width specifies the width of a tile in pixels. According to an exemplary embodiment, closed captions are displayed as a grid of 15 lines of 34 characters per line, with each character being the same vertical and horizontal size, namely 26 by 16 pixels. According to the present invention, each of these closed caption characters may be implemented as a single tile, and may for example represent an alphabetic character, a numeric character, a character space, a punctuation mark, a symbol, etc. Special character effects, such as underlining and italics are implemented as separate character fonts in RAM 13.

Figure 2:
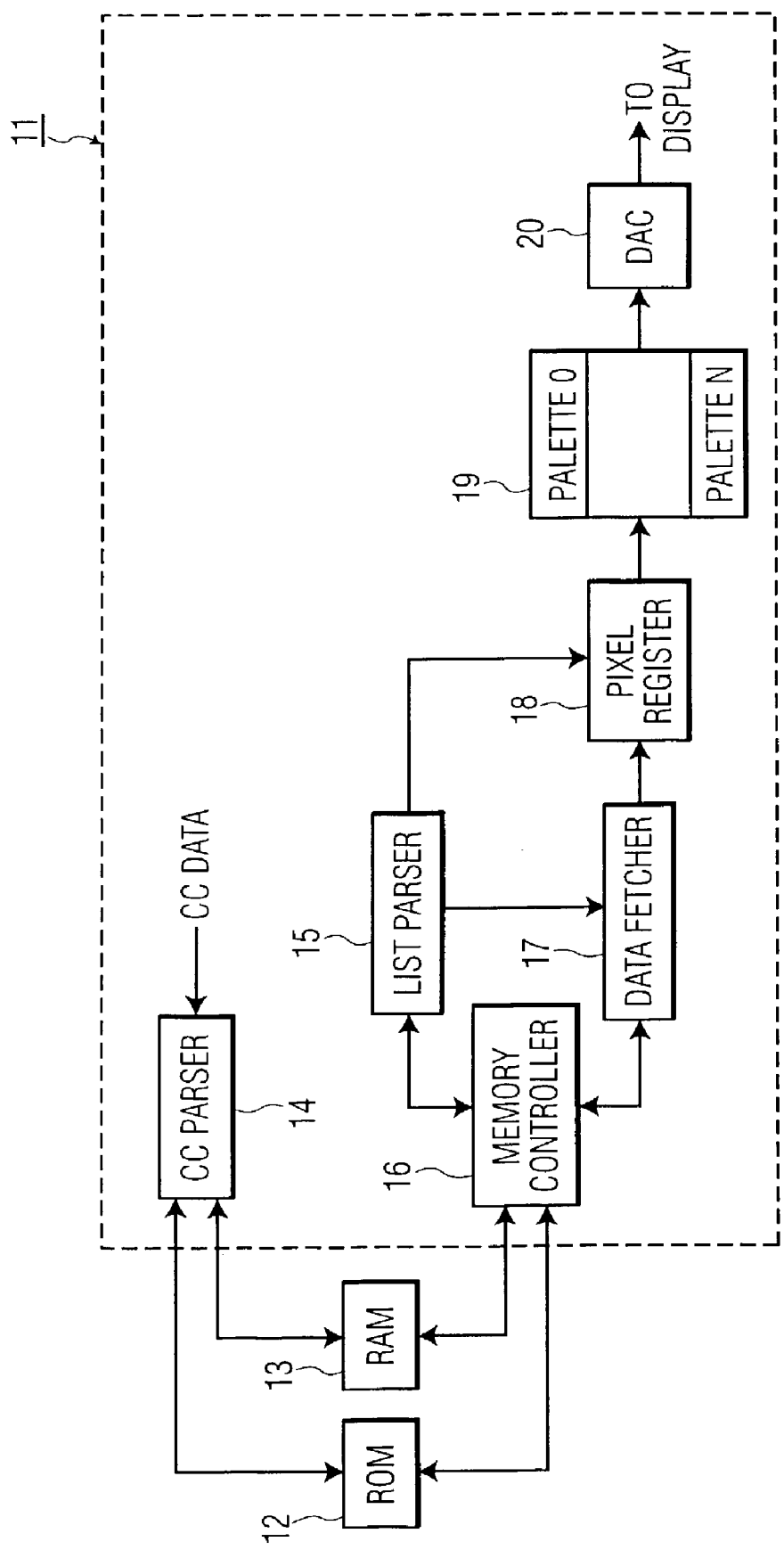
FIG. 2 is a diagram illustrating exemplary details of the controller of FIG. 1.

Turning now to FIG. 2, further exemplary details of controller 11 of FIG. 1 are shown. As shown in FIG. 2, controller 11 comprises a closed caption parser 14, a list parser 15, a memory controller 16, a data fetcher 17, a pixel register 18, a palette memory 19, and a digital-to-analog converter ("DAC") 20.

According to an exemplary mode of operation, closed caption parser 14 retrieves the program stored in ROM 12 and executes the same to thereby parse incoming closed caption data and generate display list data that is stored in RAM 13. In particular, the display list data represents a closed caption display corresponding to the incoming closed caption data, and is arranged such that each closed caption character include one or more of the following previously defined attributes: a bitmap pointer, a palette index, a resolution, a height, and a width.

According to an exemplary embodiment, closed caption parser 14 writes the display list data into RAM 13 in a predetermined manner that enables an increased number of closed caption characters to be displayed per line. As will be explained later herein, list parser 15 of controller 11 includes a hardware limitation that requires display list data for a given line to be retrieved from RAM 13 in a fixed, predetermined manner. In particular, list parser 15 is adapted to retrieve display list data from RAM 13 in accordance with a predetermined format representative of a given number of characters per line. As a result of this limitation, only a given number of closed caption characters are displayed per line if all display list data for a given line is serially written into RAM 13 in a conventional manner where a single character corresponds to a single tile. Accordingly, by storing the display list data in RAM 13 according to the principles of the present invention, the hardware limitation of controller 11 is overcome, and an increased number of closed caption characters are displayed per line.

According to an exemplary embodiment, list parser 15 of controller 11 retrieves display list data from RAM 13 on a line-by-line basis, and has a hardware limitation that causes it to retrieve the display list data assuming there are up to only 30 characters (i.e., tiles) per line. Given that 2 of these 30 character tiles are reserved as start and end tiles, only 28 characters can be displayed per line if all display list data for a given line is serially stored in RAM 13 in a conventional manner where a single character corresponds to a single tile. However, by storing the display list data in RAM 13 according to the principles of the present invention, an increased number of closed caption characters can be displayed per line. According to an exemplary embodiment, 34 closed caption characters can be displayed per line. As previously indicated, each of these characters may for example be an alphabetic character, a numeric character, a character space, a punctuation mark, a symbol, or other character.

Figure 3:
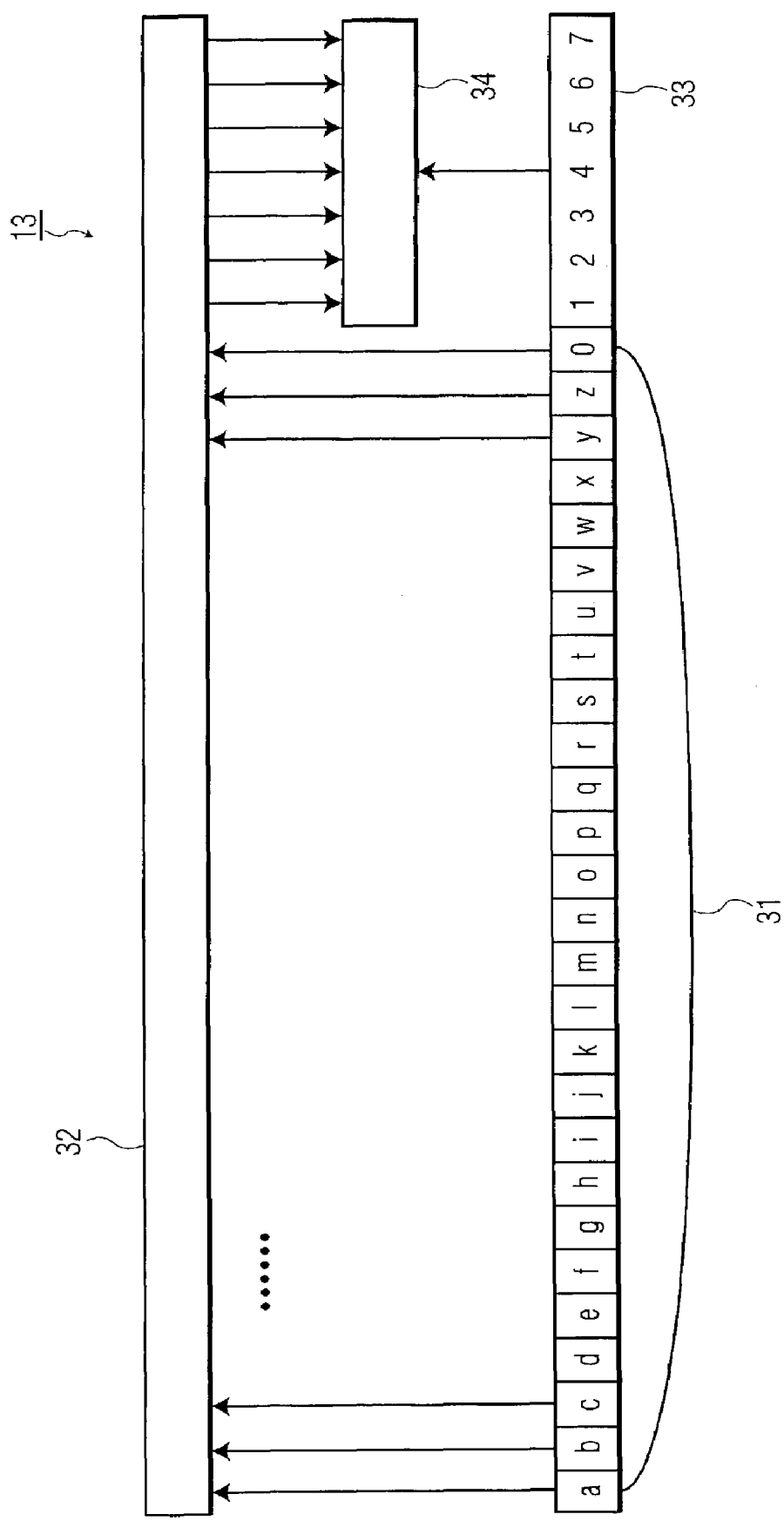
FIG. 3 is a diagram illustrating exemplary details of how display list data is stored in memory according to the present invention.

Referring to FIG. 3, a diagram illustrating exemplary details of how display list data is stored in RAM 13 according to the present invention is shown. In particular, FIG. 3 depicts how closed caption parser 14 writes display list data for one line of closed caption characters into RAM 13 for storage. As indicated in FIG. 3, display list data for each of the first 27 characters (i.e., "a, b, c . . . O") of a line is stored in character tiles 31 of RAM 13 in a conventional manner. That is, each of the first 27 characters of a line is stored as a single character tile with the bitmap pointer of each tile pointing directly to font data stored in a portion of RAM 13 represented by reference number 32. According to an exemplary embodiment, the resolution of each of these first 27 characters is 1 bit per pixel to minimize memory usage.

Display list data for the remaining 7 characters (i.e., 1, 2, 3 . . . 7) of the line, however, is stored differently than the first 27 characters. In particular, the remaining 7 characters of the line are implemented as a single character tile 33 of RAM 13 with its bitmap pointer pointing to an address of a buffer 34. During the process of writing display list data for a line of closed caption characters into RAM 13, closed caption parser 14 causes bitmap data for the remaining 7 characters of the line to be written into buffer 34 from the font data stored in the portion of RAM 13 represented by reference number 32. According to an exemplary embodiment, the resolution of these remaining 7 characters of the line is 4 bits per pixel so that the palette index for each character can be properly represented. In practice, RAM 13 may typically include several linked memory portions of the type depicted in FIG. 3 to enable the display of several lines of characters. According to the exemplary embodiment shown in FIG. 3, buffer 34 is included within RAM 13. However, it is recognized that buffer 34 may also be embodied separately from RAM 13. Moreover, character tiles 31 and character tile 33 are shown in FIG. 3 as being contiguous within RAM 13, but do not necessarily have to be.

Referring now back to FIG. 2, list parser 15 retrieves display list data from RAM 13 by providing address information to memory controller 16. In particular, list parser 15 provides address information (e.g., a beginning address) for a given line of display list data in RAM 13 to memory controller 16, which enables the display list data for the given line to be retrieved from RAM 13. According to an exemplary embodiment, memory controller 16 serially retrieves display list data for the first 27 characters of a line from character tiles 31 of RAM 13 in a conventional manner, as each of these characters is stored as a single character tile. To retrieve display list data for the last 7 characters of a line, memory controller 16 simply retrieves the bitmap pointer from character tile 33, which points to the address of buffer 34 containing the bitmap data for the last 7 characters of the line (see FIG. 3).

It is noted that display list data for more than or less than 7 characters can be stored in buffer 34 according to the principles of the present invention. However, in the event that display list data for more than 7 characters is stored in buffer 34, the resulting display may be generated more slowly than desired due to additional processing requirements. Accordingly, the number of characters represented in buffer 34 is a trade off between the number of characters to be displayed on a line, and display generation time.

List parser 15 parses the retrieved display list data to extract the bitmap pointers and palette indexes therefrom. List parser 15 then transmits the extracted bitmap pointers to data fetcher 17, and the extracted palette indexes to pixel register 18. Data fetcher 17 receives the bitmap pointers from list parser 15, and uses the bitmap pointers to retrieve corresponding bitmap data from RAM 13 via memory controller 16. Data fetcher 17 transmits the retrieved bitmap data as individual pixel data to pixel register 18.

Pixel register 18 receives the palette indexes from list parser 15 and the pixel data from data fetcher 17, and outputs the pixel data and palette indexes to palette memory 19 on a first-in, first-out (FIFO) basis. The palette indexes operate as address pointers for outputting the pixel data from palette memory 19. As shown in FIG. 2, palette memory 19 includes a predetermined number of palette entries designated 0 through N, and each palette entry corresponds to a given color and/or transparency attribute.

DAC 20 performs a digital-to-analog conversion process on the pixel data output from palette memory 19, and outputs the analog results to a display portion of video system 100. The analog outputs may, for example, be in a format such as RGB (i.e., red, green, blue).

Figure 4:
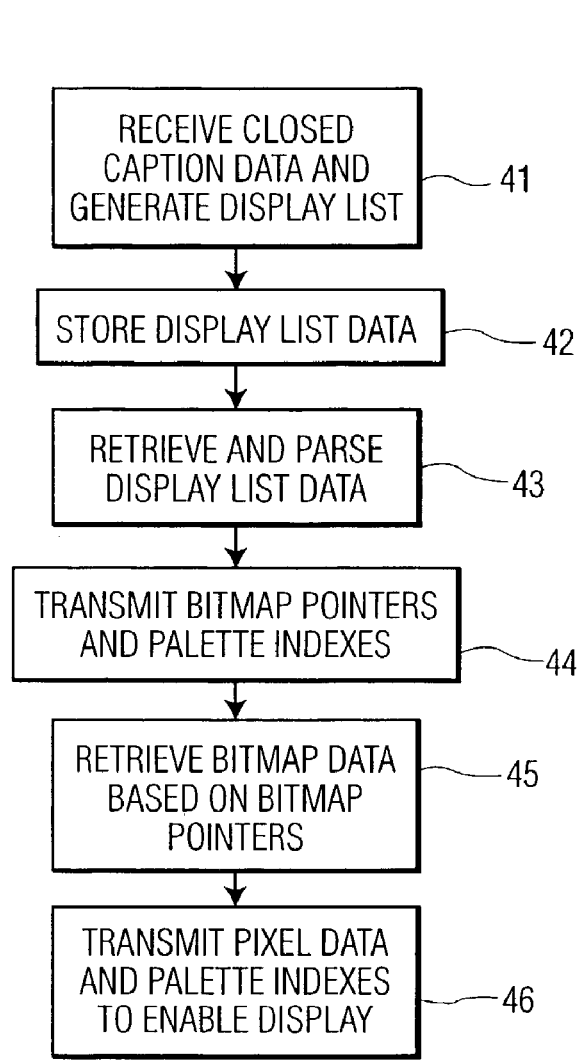
FIG. 4 is a flowchart illustrating exemplary steps for carrying out the present invention.

Referring now to FIG. 4, a flowchart 40 illustrating exemplary steps for carrying out the present invention is shown. For purposes of example and explanation, the steps of FIG. 4 will be described with reference to the elements of FIGS. 1 through 3, and to a display operation where only a single line of characters is to be displayed. It will be intuitive, however, that the steps of FIG. 4 may be utilized to enable a plurality of lines of characters to be displayed. Accordingly, the steps of FIG. 4 are merely exemplary, and are not intended to limit the present invention in any manner.

At step 41, closed caption parser 14 of controller 11 receives from tuner 10 closed caption data representative of a number of characters to be displayed on a line. According to an exemplary embodiment, the received closed caption data represents 34 characters. As previously indicated, tuner 10 may extract the closed caption data from a particular portion of the video signal, such as from the VBI of an analog video signal, or from one or more packets of a digital video signal. Also at step 41, closed caption parser 14 generates display list data representing a closed caption display corresponding to the received closed caption data. Accordingly, the display list data generated at step 41 represents a closed caption display of 34 characters.

Figure 5:
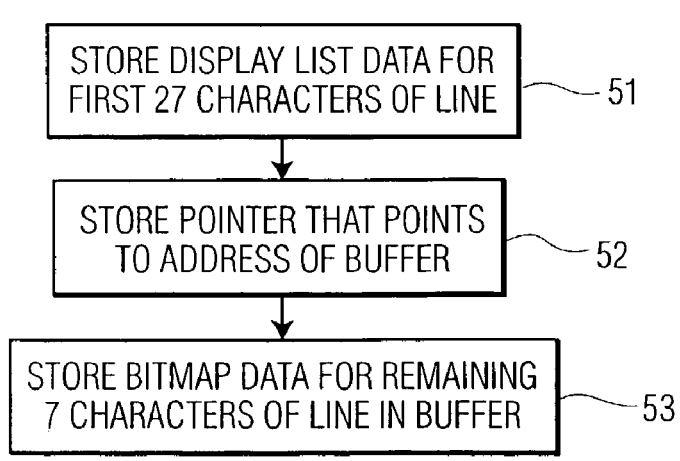
FIG. 5 is a flowchart illustrating exemplary steps for storing display list data according to the present invention.

At step 42, closed caption parser 14 stores the display list data in RAM 13 in the previously explained manner represented in FIG. 3. Referring to FIG. 5, a flowchart 42 illustrating further exemplary details of step 42 of FIG. 4 is shown. At step 51 of FIG. 5, closed caption parser 14 serially stores display list data for the first 27 characters of the line in character tiles 31 of RAM 13, as depicted in FIG. 3. That is, each of the first 27 characters of the line is stored as a single character tile in a conventional manner. At step 52 of FIG. 5, closed caption parser 14 stores a bitmap pointer that points to an address of buffer 34 in character tile 33 of RAM 13, as depicted in FIG. 3. Then, at step 53 of FIG. 5, closed caption parser 14 stores bitmap data for the remaining 7 characters of the line in buffer 34 of RAM 13, as depicted in FIG. 3.

Referring back to FIG. 4, at step 43, list parser 15 causes the display list data to be retrieved from RAM 13 in the previously explained manner. That is, list parser 15 controls memory controller 16 to serially retrieve the display list data for the first 27 characters of the line from character tiles 31 of RAM 13 in a conventional manner, as each of these characters is stored as a single character tile. For the last 7 characters of the line, memory controller 16 retrieves the bitmap pointer from character tile 33 which points to the address of buffer 34 containing the bitmap data for the last 7 characters of the line (see FIG. 3). Also at step 43, list parser 15 parses the retrieved display list data, and extracts therefrom the bitmap pointers and palette indexes.

Next, at step 44, list parser 15 transmits the bitmap pointers to data fetcher 17, and transmits the palette indexes to pixel register 18. At step 45, data fetcher 17 controls memory controller 16 to retrieve bitmap data from RAM 13 based on the bitmap pointers provided by list parser 15. That is, memory controller 16 retrieves from RAM 13 the bitmap data representative of each of the characters to be displayed on the line.

Then, at step 46, data fetcher 17 transmits the retrieved bitmap data as individual pixel data to pixel register 18, which in turn transmits the received pixel data and palette indexes to palette memory 19 to enable a closed caption display of 34 characters on a line.

As described herein, the present invention provides a technique for processing auxiliary information, such as closed caption or teletext data, in a video system that advantageously enables an increased number of characters to be displayed per line. While an exemplary embodiment has been described herein that increases the number of display characters per line from 28 to 34, it will be intuitive that the principles of the present invention can be applied to produce displays having different numbers of characters per line.

The present invention is particularly applicable to various video systems, either with or without a display device. Accordingly, the phrase "video system" as used herein is intended to encompass various types of systems or apparatuses including, but not limited to, television sets or monitors that include a display device, and systems or apparatuses such as a set-top box, video cassette recorder ("VCR"), digital versatile disk ("DVD") player, video game box, personal video recorder ("PVR") or other video system that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for enabling display of auxiliary information included in a video signal, comprising steps of:
   receiving the auxiliary information representative of a first number of characters to be displayed per line;
   storing display list data representative of the received auxiliary information wherein the display list data representative of a first portion of the first number of characters and a pointer pointing to an address of a buffer is stored in a memory and the display list data representative of a second portion of the first number of characters is stored as bitmap data in the buffer;
   retrieving the stored display list data representative of the first and second portions of the first number of characters using a controller; and
   outputting pixel data to enable the display of the auxiliary information, wherein the display provides the first number of characters per line;
   wherein:
   the display list data for the first portion of the first number of characters is stored in a plurality of character tiles; and
   the pointer is stored in a single character tile.

2. The method of claim 1, wherein the auxiliary information comprises information representative of a real-time information component of the video signal.

3. The method of claim 1, wherein:
   the auxiliary information comprises closed caption data; and
   the pointer points to bitmap data within the buffer for each character to be displayed.

4. The method of claim 1, wherein:
   the auxiliary information comprises closed caption data; and
   the closed caption data is received in a vertical blanking interval portion of the video signal.

5. The method of claim 1, wherein:
   the auxiliary information comprises closed caption data; and
   the closed caption data is received in one or more packets of digital data represented by the video signal.

6. The method of claim 1, wherein:
   the first number of characters comprises 34 characters; and
   the second number of characters comprises 28 characters.

7. The method of claim 1, wherein the plurality of character tiles and the single character tile are contiguous.

8. A video system, comprising:
   a tuner operative to receive a video signal including auxiliary information representative of a first number of characters to be displayed per line;
   a buffer;
   a memory operative to store display list data representative of the received auxiliary information, wherein said memory stores the display list data representative of a first portion of the first number of characters and a pointer pointing to an address of said buffer and said buffer stores the display list data representative of a second portion of the first number of characters is stored as bitmap data, and
   a controller operative to retrieve the stored display list data representative of the first and second portions of the first number of characters;
   wherein:
   the display list data for the first portion of the first number of characters is stored in a plurality of character tiles of the memory; and the pointer is stored in a single character tile of the memory.

9. The video system of claim 8, wherein the controller is further operative to output pixel data to enable a display of the auxiliary information, wherein the display provides the first number of characters per line.

10. The video system of claim 8, wherein the auxiliary information comprises information representative of a real-time information component of the video signal.

11. The video system of claim 8, wherein:
    the auxiliary information comprises closed caption data; and
    pointer points to bitmap data for each character to be displayed.

12. The video system of claim 8, wherein:
    the auxiliary information comprises closed caption data; and
    the closed caption data is received in a vertical blanking interval portion of the video signal.

13. The video system of claim 8, wherein:
    the auxiliary information comprises closed caption data; and
    the closed caption data is received in one or more packets of digital data represented by the video signal.

14. The video system of claim 8, wherein:
    the first number of characters comprises 34 characters; and
    the second number of characters comprises 28 characters.

15. The video system of claim 8, wherein the plurality of character tiles and the single character tile are contiguous within the memory.

* * * * *